US007006706B2

(12) United States Patent
Sobel et al.

(10) Patent No.: US 7,006,706 B2
(45) Date of Patent: Feb. 28, 2006

(54) IMAGING APPARATUSES, MOSAIC IMAGE COMPOSITING METHODS, VIDEO STITCHING METHODS AND EDGEMAP GENERATION METHODS

(75) Inventors: Irwin Sobel, Menlo Park, CA (US); Paul M. Hubel, Mt. View, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 651 days.

(21) Appl. No.: 10/121,835

(22) Filed: Apr. 12, 2002

(65) Prior Publication Data

US 2003/0194149 A1    Oct. 16, 2003

(51) Int. Cl.
*G06K 9/36* (2006.01)
*G09G 5/00* (2006.01)

(52) U.S. Cl. .................................. 382/284; 345/629
(58) Field of Classification Search ................ 382/266, 382/274, 276, 284, 312; 345/629, 648, 683, 345/423
See application file for complete search history.

(56) References Cited

U.S. PATENT DOCUMENTS

| 6,038,348 | A | | 3/2000 | Carley |
|---|---|---|---|---|
| 6,064,399 | A | * | 5/2000 | Teo ............................ 345/629 |
| 6,147,691 | A | * | 11/2000 | Takahashi .................... 345/589 |
| 6,173,087 | B1 | * | 1/2001 | Kumar et al. ................ 382/284 |
| 6,393,163 | B1 | * | 5/2002 | Burt et al. ................... 382/294 |
| 6,476,809 | B1 | * | 11/2002 | Browne ....................... 345/423 |

OTHER PUBLICATIONS

"Sarnoff Corporation Homepage"; www.sarnoff.com; Mar. 2, 2002; 1 p.

"Pyramid Vision Technology Homepage"; www.pyramidvision.com; Mar. 2, 2002; 1 p.

"Apple-QuickTime-QuickTime VR Authoring"; www.apple.com/quicktime/qvtr.html; Mar. 2, 2002; 2 pp.

"QuickTime VR Panoramas with an MC Zenitar 16mm Fisheye"; http:/teladesign.com/photo/zenitar-panoramas.html; Mar. 2, 2002; 7 pp.

"Photobubble"; www.ipix.com/products/im/immersive.shtml; Mar. 2, 2002; 1 p.

"A. Murat Tekalp Home Page"; www.ee.tochester.edu:8080/users/tekalp.html; Mar. 2, 2002; 2 pp.

"Digital Video Filtering"; www.ee.rochester.edu:8080/users/tekalp/research/filter.html; Mar. 2, 2002 1p.

"Object/Motion Segmentation and Tracking"; www.ee.rochester.edu:8080/users/tekalp/research/segment.html; Mar. 2, 2002; 1p.

(Continued)

*Primary Examiner*—Kanjibhai Patel

(57) ABSTRACT

Imaging apparatuses, mosaic image compositing methods, video stitching methods and edgemap generation methods are provided. An exemplary imaging apparatus includes data circuitry configured to provide image data for a plurality of frames of a source and processing circuitry configured to generate mosaic data for the source using the image data, wherein the processing circuitry is configured to convert the image data into a plurality of edgepoints for individual ones of the frames, to identify a plurality of common edgepoints in a first frame and a second frame, to determine a positional representation with respect to the first frame and the second frame using the common edgepoints, and to map image data from one of the first frame and the second frame into the mosaic data using the positional representation to generate a mosaic image of the source using the mosaic data.

34 Claims, 9 Drawing Sheets

OTHER PUBLICATIONS

"Welcome to Liberate Technologies"; www.liberate.com; Mar. 2, 2002; 1p.

"Toshiba Introduces World's Smallest, Lightest PC Card Digital Camera for Mobile Computing—32 Bit CardBus Interface Realizes High Speed Transmission of Moving"; www.toshiba.co.jp/about/press/1996_11/pr1501.html; Mar. 2, 2002; 2 pp.

"Super Resolution Video Reconstruction with Arbitrary Sampling Lattices and Non-zero Aperature Time" www.citeseer.nj.nec.com/146583.html; Mar. 2, 2002; 3 pp.

"Consumer Electronics Guide: DCR-VX2000"; www.sel.sony.com; Mar. 2, 2002 2 pp.

"VideoBrush PC Stitching Applications"; www.sarnoff.com/government_professional/vision_technology/products/videobrush_pc_stitching.asp; Mar. 2, 2000; 1 pp.

"VideoBrush Panorama 2.0 FAQ: Frequently Asked Questions"; www.ipix.com/products/support/picturew orks/videobrush/panfaq2.html; Mar. 2, 2000; pp. 1-4.

"Shmuel Peleg Home Page"; www.cs.huji.ac.il/ peleg.html; Mar. 2, 2002; 3pp.

"Panaoramic Mosaicing with VideoBrush"; Peleg et al.; DARPA Image Understanding Workshop; May 1997; pp. 268-272.

"HUJI Computer Vision Papers"; www.cs.huji.ac.il/labs/vision/biblio.html; Mar. 2, 2002; 7 pp.

"Michael Irani Home Page"; www.wisdom.weizman.ac.il/irani.html; Mar. 2, 2002; 3 pp.

"Faculty; Gotsman, Craig, Assoc. Prof."; http://www.cs.technion.ac.il/users/wwwb/cgi-bin/facultynew.cgi?Gotsman.Craig.html; May 22, 2002; 2 pp.

"Panoramic & Planar Mosaicing"; http://hpiles/glyph/netzer/mosaic.html; May 22, 2002; 5pp.

"Richard Szeliski's Home Page"; http://research.microsoft.com/-szeliski.html; Mar. 2002; 2 pp.

"Richard Szeliski's Publications"; http://research.microsoft.com/-szeliski/publications.html; May 2002; 15 pp.

"Sing Bing Kang's Home Page"; http://research.microsoft.com/users/sbkang.html; Mar. 2, 2002; 2 pp.

"Virtual Navigation of Complex Scene using Clusters of Cylindrical Panoramic Images"; Kang et al.; Cambridge Research Laboratory, Technical Report Series; Sep. 1997; pps. 1-22.

"The CMU Video-Rate Steroe Machine"; http://www.-2.cs.cmu.edu/afs/cs/project/stereo-machine/www/StereMachine.html; Mar. 2002; 4 pp.

"VSAM Research"; http://www.-2.cs.cmu.edu/-vsam/research.html; Mar. 2002; 4 pp.

"VSAM Research Links"; http://www.-2.cs.cmu.edu/ vsam/OldVsamWeb/research.html; Mar. 2002; 2 pp.

"Harry Shum's Home Page"; www.research.microsoft.com/users/hsum/html; Mar. 2, 2002; 2 pp.

"Automatic Panoramic Image Merging"; Haeberli et al.; www.sgi.com/grafica/merge/index.html; Mar. 2, 2002; 4 pp.

"Ali Azarbayejani Reseach Description", www-white.media.mit.edu/-ajazar.html; Mar. 2, 2002; 3 pp.

"The Dance of Bits and Atoms"; Alex Pentland; www-white.mit.edu/sandy/profile.html; Mar. 2, 2002; 2 pp.

"Prof. Steve Man's Home Page"; www.eecg.toronto.edu/-mann.html; Mar. 2, 2002; 3 pp.

"Video Orbits of the Projective Group: A New Perspective on Image Compositing."; Mann et al.; IEEE Transaction and Image Processing, vol. 6, No. 9; Sep. 1997; pp. 1281-1295.

"The "Claire" Image Sequence"; www.wearcam.org/orbits/claire.html; Mar. 2, 2002; 11 pp.

"Dominant and Multiple Motion Estimation for Video Representattion"; Harpreet Saw hney; www.neci.nj.nec.com/homepages/oliensis/AbstractSaw hney.html; Mar. 2, 2002; 1 pp.

"Stefano Soatto's WWW Homepage"; www.vision.caltech.edu/soatto/soatto.html; Mar. 2, 2002; 2 pp.

"Pietro Perona Biography Page"; www.ee2.caltech.edu/People/Faculty/perona.html; Mar. 2, 2002; 1 p.

"Dynamic Motion Estimation on the Essential Manifold: Practical Experiments and Unifying Framework (Abstract)"; Soatto et al; www.neci.nj.nec.com/homepage/oliensis/AbstractSoattoPerona.html; Mar. 2, 2002; 1 p.

"Dynamic Estimation of 3-D Structure from Motion"; Stefano Soatto; www.vision.caltech.edu/soatto/research/structure.html; Mar. 2, 2002; 3 pp.

"A Quasilinear Solution to Multiframe Structure from Motion"; John Oliensis; www.neci.nj.nec.com/homepage/oliensis/AbstractOliensis.html; Mar. 2, 2002; 1 p.

"Publications from the NASA Ames 3D Super-Resolution Project"; http://ic.nasa.gov/projects/ELVIS/publications/index.html; Mar. 2, 2002; 1 p.

"Digital Video Filtering for Standards Conversion and Resolution Enhancement (Abstract)"; Andrew J. Patti; www.ee.rochester.edu:8080/users/tekalp/students/patti.html; Dec. 4, 1995; 1 p.

"Video Brush Software Familiarity"; www.toshiba.com; Mar. 2, 2002; 1p.

* cited by examiner

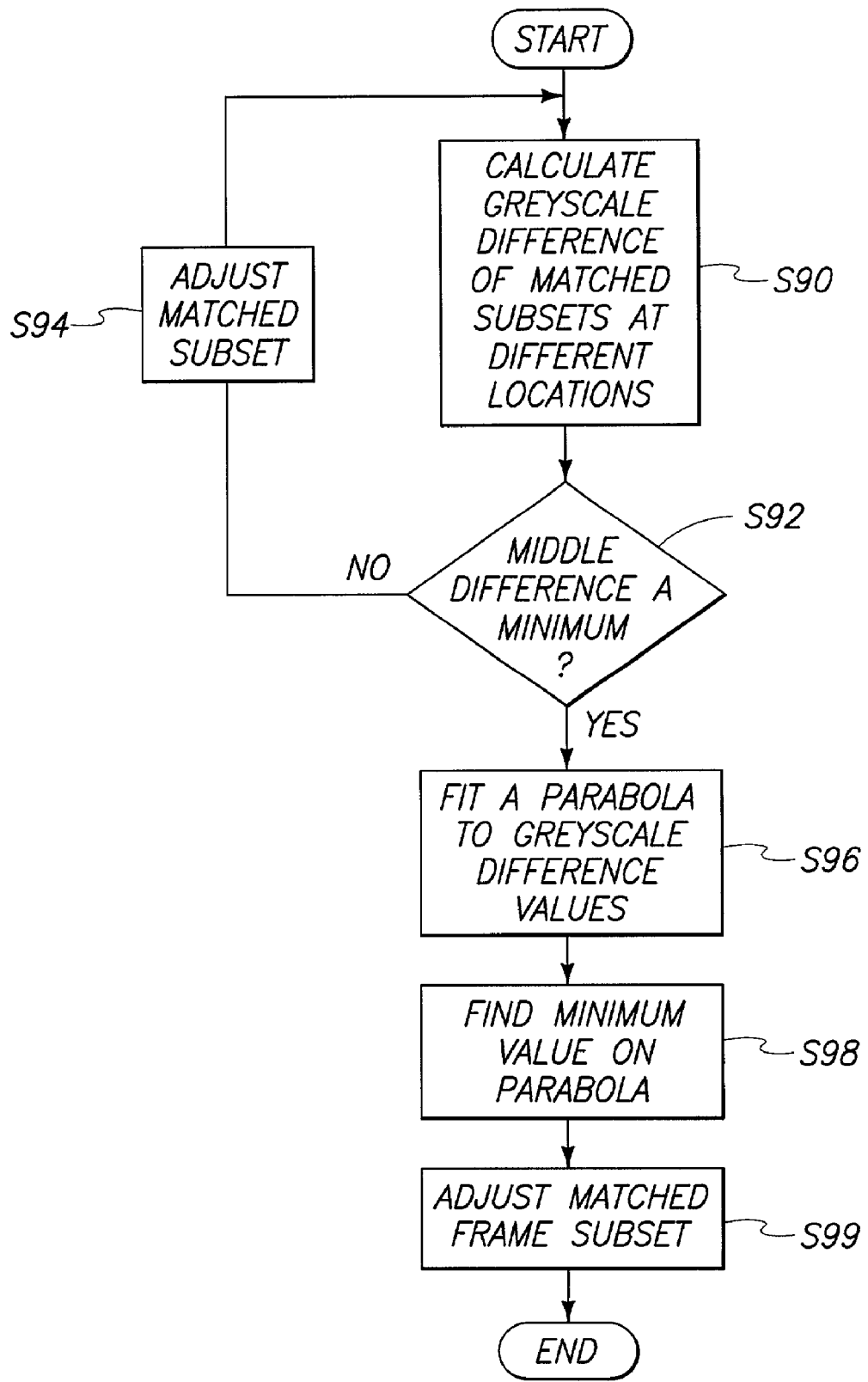

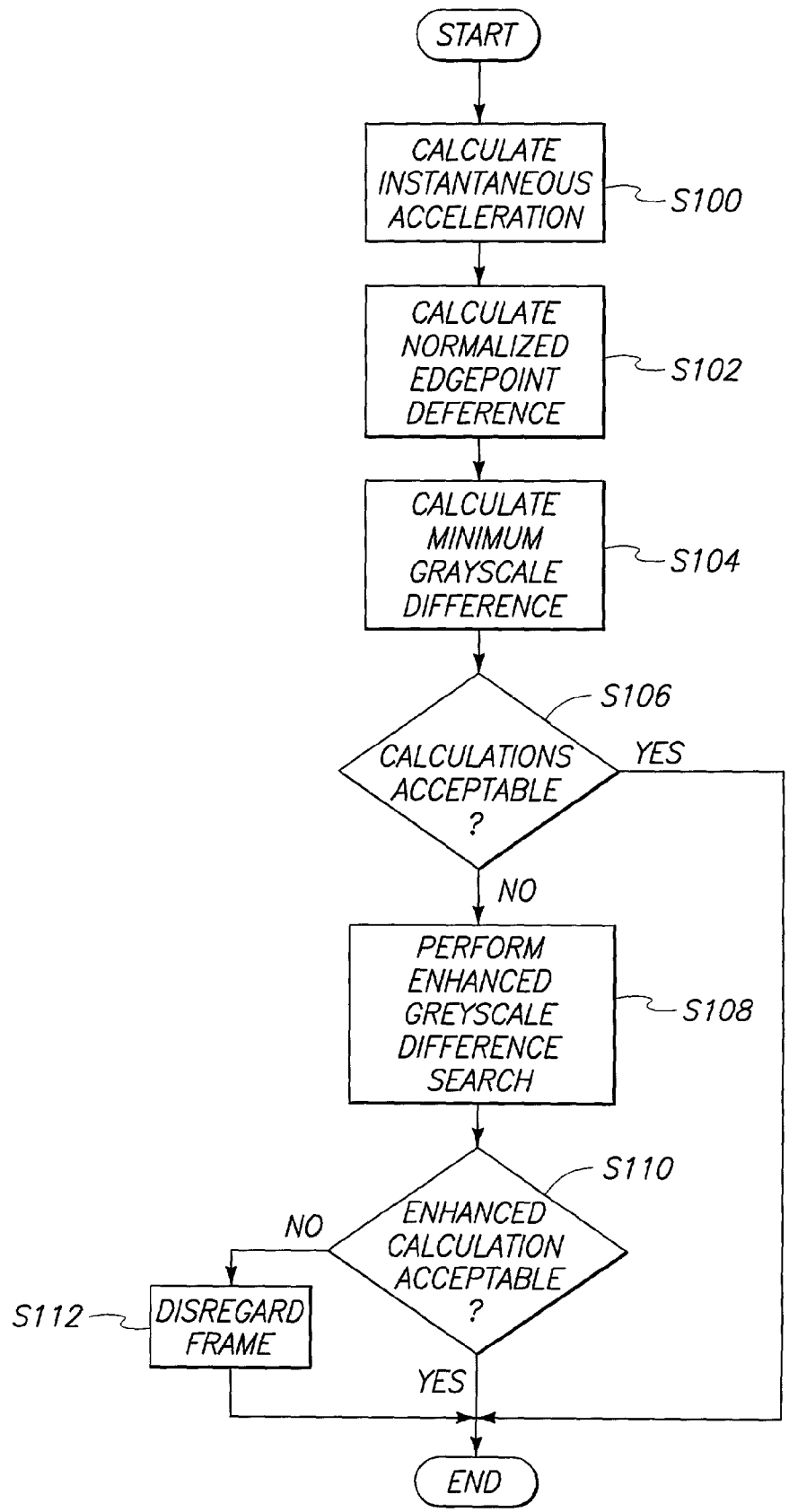

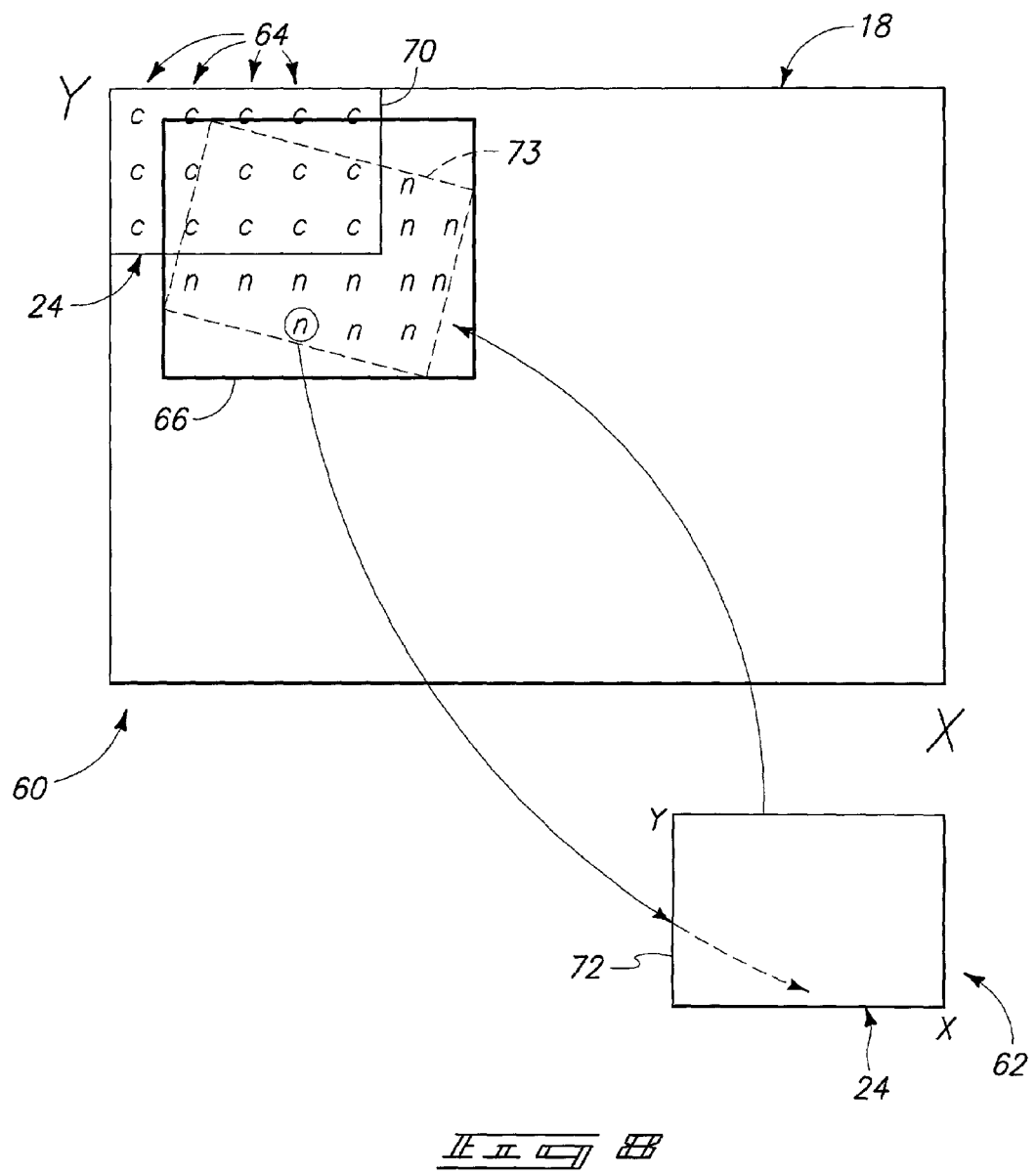

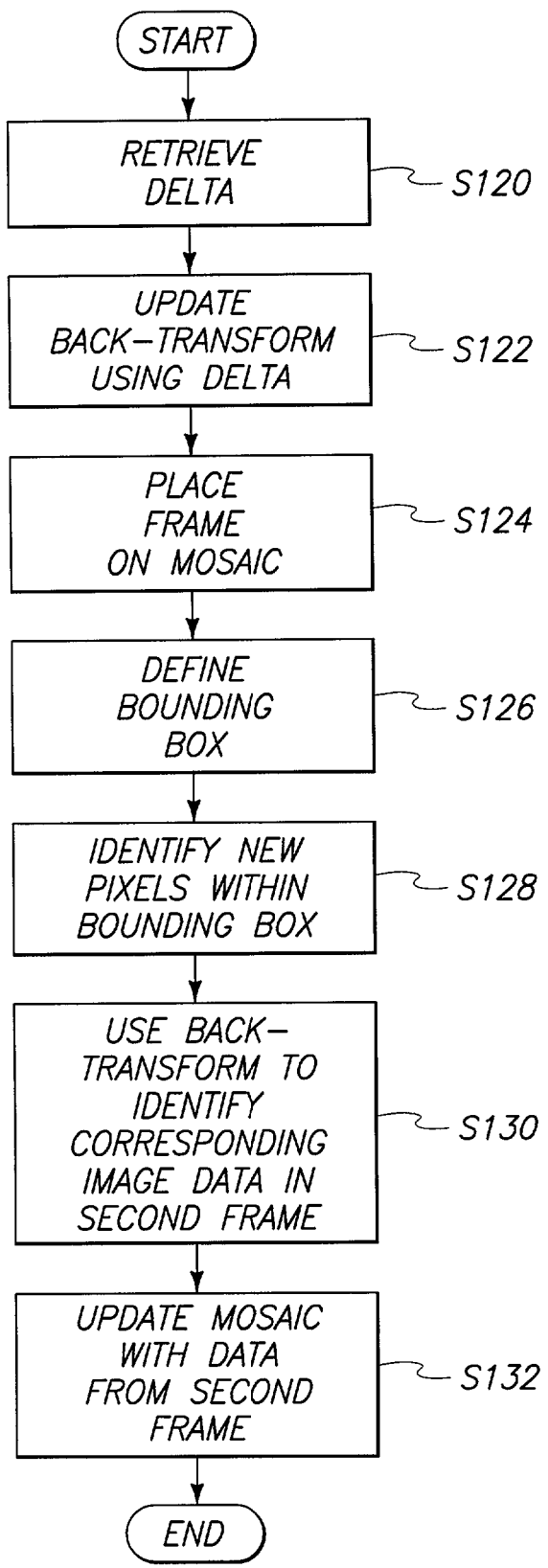

IMAGING APPARATUSES, MOSAIC IMAGE COMPOSITING METHODS, VIDEO STITCHING METHODS AND EDGEMAP GENERATION METHODS

FIELD OF THE INVENTION

The invention relates to imaging apparatuses, mosaic image compositing methods, video stitching methods and edgemap generation methods.

BACKGROUND OF THE INVENTION

With the advancements experienced in digital processing capabilities, increased speeds of microprocessors and increased memory storage capacities, processing of relatively large amounts of video data in digital formats may be improved. Video streams are typically rich sources of information. For example, data according to the NTSC video standard consists of a stream of thirty images or frames per second and individual frames consist of two interlaced fields wherein one contains odd-numbered scan lines and the other contains even-numbered lines. Frames digitized according to a CCIR601 YUV 4:2:2 format yields 720×486×2=699, 840 bytes. The digitized video stream rate is 30×699,840, or approximately 21M bytes/second. Because of retrace times, data flow may not be constant at this rate but is typically clocked out at 27M bytes/second line-bursts.

Reconstruction problems of computing a spatial CAD-type scene-model of locations, shapes and orientations of visible surfaces in a scene are posed with the use of cameras panning over a static 3-D scene. One solution has utilized stereo triangulation (e.g., use in surveying and creation of topographic maps). The exemplary procedure includes identifying a feature in two images from differing viewpoints, and measuring the feature's image coordinates in the two images. The internals of the camera may be calibrated by measuring the focal length of the camera lens and geometrical characteristics of the camera's image formation. Externals of the camera may be calibrated by measuring a location and orientation of the second viewpoint relative to a coordinate frame located in the first viewpoint. The triangle consisting of the two viewpoints, and an unknown feature location may be solved given the coordinate locations of the feature in the two images. This can be accomplished by constructing rays from the two viewpoints through image-plane coordinates, and solving for a best 3-D intersection plane.

Alternate strategies for recovering 3-D descriptions of scenes from one or more image can be obtained by utilizing "shape from shading" which allows inference of shape of diffusely reflecting (matte) surfaces by making various assumptions about the distribution and types of light sources present. Contextual assumptions may be made if it can be assumed that a scene contains only diffusely reflective polygonal objects resting on a planar surface illuminated by point source of light at a known position and orientation. This permits processing of an image to extract a line-drawing of surface boundary contours, application of consistency rules and extraction of 3-D locations of other visible vertices. Conventional devices implementing conventional image processing methods are relatively complex and involve significant cost.

Mosaicing can be thought of as a special case of 3-D reconstruction wherein the scene itself can be completely described in two dimensions. Two common examples of this are panning and scanning. Panning refers to an instance when a camera is panned about a single viewpoint. In this case there is no parallax between frames as every object appears from the same viewpoint in every frame. The whole scene can be described by a single spherical image centered at the viewpoint. The acquired frames in a sequence are treated as windows into the sphere projected onto the camera image plane. Scanning refers to an instance when the scene to be recorded is itself a 2D surface. In this case, the camera is translated, usually but not necessarily, parallel to the surface. The acquired frames in a sequence are treated as windows into the surface, projected onto the camera image plane. This situation is common in document scanning.

As described below, aspects of the present invention provide improved panning, scanning and other imaging apparatuses and methodologies which enable robust stitching of video fields into mosaics in an efficient manner.

SUMMARY OF THE INVENTION

According to one aspect of the invention, an imaging apparatus comprises data circuitry configured to provide image data for a plurality of frames of a source and processing circuitry configured to generate mosaic data for the source using the image data, wherein the processing circuitry is configured to convert the image data into a plurality of edgepoints for individual ones of the frames, to identify a plurality of common edgepoints in a first frame and a second frame, to determine a positional representation with respect to the first frame and the second frame using the common edgepoints, and to map image data from one of the first frame and the second frame into the mosaic data using the positional representation to generate a mosaic image of the source using the mosaic data.

According to another aspect of the invention, a mosaic image compositing method comprises providing image data of a plurality of frames of an image, converting the image data to edgemap data, creating a mosaic image using image data from a plurality of the frames and coordinating placement of the image data into the mosaic image using the edgemap data.

According to yet another aspect of the invention, a video stitching method comprises providing image data for a plurality of frames, converting the image data into edgemap data, first identifying a frame subset in a first frame using respective edgemap data of the first frame, second identifying the frame subset in a second frame using respective edgemap data of the second frame, providing movement information indicating movement between the first frame and the second frame responsive to the first identifying and the second identifying and combining at least some of the image data of the second frame with mosaic data using the movement information.

According to an additional aspect of the invention, an edgemap generation method comprises providing image data for a plurality of frames and corresponding to a plurality of pixels for individual ones of the frames, defining a plurality of frame thresholds using the image data of the respective frames and the frame thresholds correspond to respective ones of the frames, individually selecting the frames and the respective frame thresholds for the selected frames, individually comparing the image data of the selected frame with the respective selected frame threshold and identifying selected pixels as comprising edgepoints responsive to the comparing for individual ones of the frames.

DESCRIPTION OF THE DRAWINGS

FIG. 6 depicts a flowchart of an exemplary methodology for refining matched frame subsets.

FIG. 7 depicts an exemplary methodology for evaluating a match quality of matched frame subsets.

FIG. 8 depicts an illustrative representation of exemplary compositing operations.

FIG. 9 depicts a flowchart of an exemplary methodology for compositing frame data into mosaic data.

DETAILED DESCRIPTION OF THE INVENTION

Figure 1:
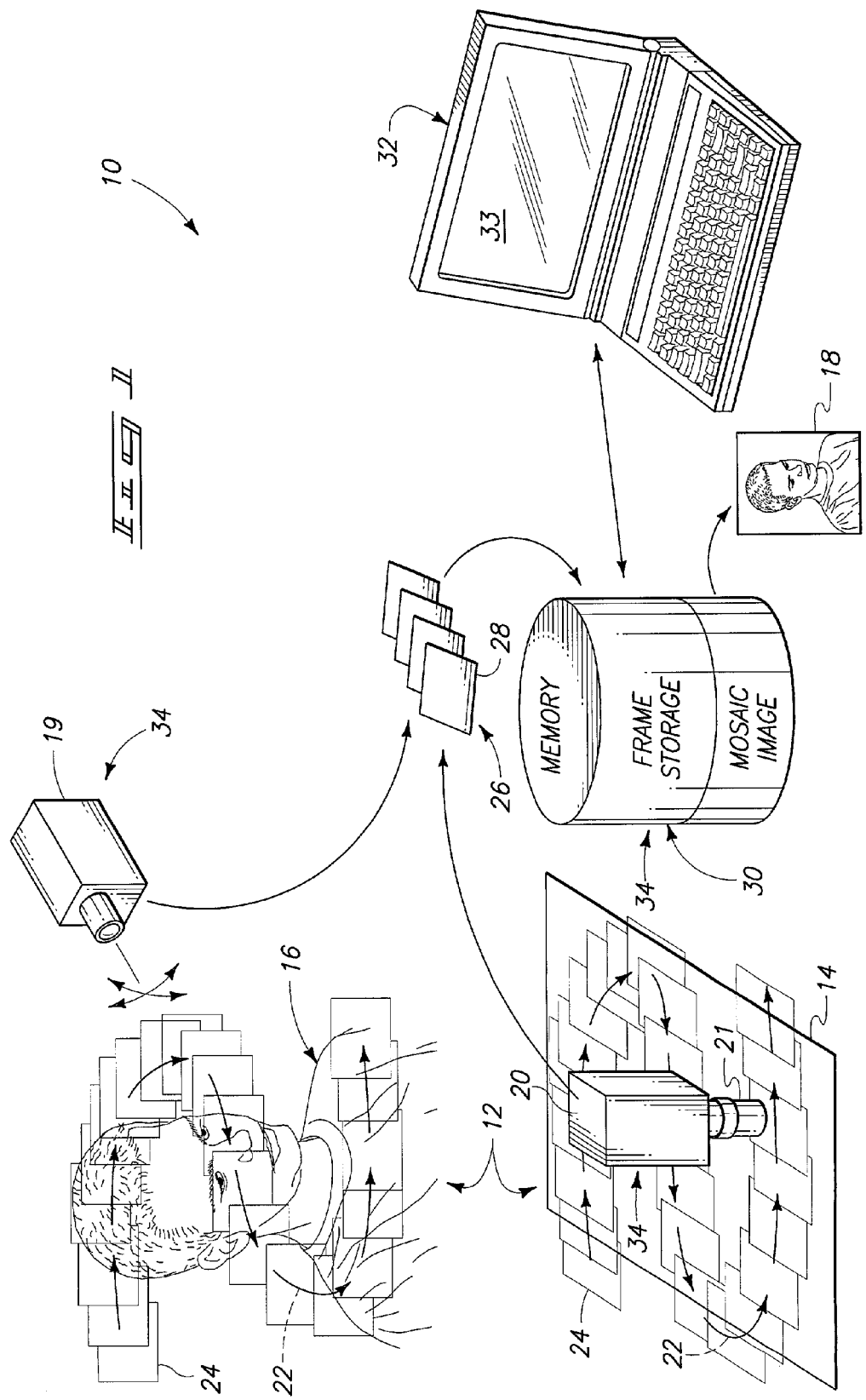
FIG. 1 depicts an illustrative representation of an exemplary imaging apparatus.

Referring to FIG. 1, an exemplary imaging apparatus 10 is illustrated. The depicted apparatus 10 shows one possible arrangement of components configured to execute or implement exemplary panning or scanning imaging methodologies according to aspects of the present invention. In one arrangement, apparatus 10 is configured to stitch video fields into mosaic images. Other configurations of apparatus 10 are possible.

As described below, imaging apparatus 10 is arranged to generate mosaic images from various types of sources 12. For example, exemplary sources 12 are illustrated in FIG. 1 and include a document or surface 14 and a panoramic scene 16. Other types of sources 12 may be imaged using imaging apparatus 10.

A plurality of image devices 19, 20 are shown in FIG. 1 for discussion purposes with respect to the plural images 12, although in typical applications, a single one of devices 19, 20 may be utilized inasmuch as one source 12 is typically imaged by the apparatus 10 at a given moment in time. Imaging apparatus 10 is arranged to generate a mosaic image 18 using a plurality of imaged fields or frames of the source 12 obtained using the appropriate device 19, 20.

The image device 20 adjacent source 14 includes a transparent barrel attachment 21 to generate a plurality of images from document source 14. The barrel attachment 21 serves to facilitate maintenance of a fixed-distance of device 20 to the document while admitting ambient lighting in through its sides. Alternatively, the barrel attachment 21 could be opaque and include a light source within it. In accordance with exemplary imaging operations, image devices 19, 20 are moved along respective paths 22 during imaging of respective sources 14, 16. Image devices 19, 20 expose or obtain a plurality of frames also referred to as frame images 24 of the sources 12 during imaging operations. Movement of the respective image device 19, 20 typically is recorded in intermediate successive frame images 24. Respective image devices 19, 20 are configured to generate digital data comprising image data 26 collectively for the frame images 24. The image data 26 comprises respective digital frame data 28 (illustratively represented as a multi-frame sequence) corresponding to respective frame images 24.

Exemplary aspects of the invention are described with reference to image data comprising CCIR601 4:2:2 YUV color video format image data. 640×240 pixels of raster data were cropped from individual CCIR601 720×243 fields in exemplary processing by removing a back porch black bar due to horizontal retrace and one or two scan lines at the beginning and the end of fields. Alternate lines in the individual cropped-fields were linearly interpolated to infer a 640×480 cropped frame pixel raster in the described exemplary arrangement. The frame pixel rasters are referred to in the exemplary description hereof as frame data 28 even though they are inferred from a single field. Frame data 28 was processed in an exemplary configuration at a 60 Hz rate. Frame data 28 of other appropriate digital raster sizes may be provided and utilized at different rates.

Aspects of the invention are described herein with respect to a plurality of frame images 24. Exemplary aspects below describe calculating or obtaining movement data or information of a respective device 19, 20 and\or source 12 between obtaining frame images. The terms first (or previous) frame image and second (or current) frame image refer to a plurality of different frame images of the sequence. For example, first and second frame images may refer to two successive and adjacent frame images of a sequence.

As described below, frame data is converted or mapped to mosaic data to generate mosaic images 18. The terms first frame image and second frame image may be utilized to refer to the same frame image (or frame data) at different moments in time. For example, first frame data may refer to frame data which has already been mapped to mosaic data and second frame data may refer to the next frame data to be converted or mapped to mosaic data using the first frame data. Following mapping of the second frame data, the second frame data may be referred to as first frame data and the following or next frame data to be mapped becomes the second frame data.

Exemplary operational aspects of apparatus 10 include a tracking phase and a compositing phase. The tracking phase provides movement data of frame subsets or features between a plurality of frame images 24 and corresponding to movement of image 12 and/or the respective device 19, 20 during imaging. Movement data may be used to provide positional representations. Exemplary positional representations include deltas and a list of respective back-transforms which may be utilized to map frame data 28 from a next or second frame into a previous frame and a mosaic coordinate system to create mosaic image 18. The list of back-transforms may be utilized to combine raw frame data from a next frame image into a current frame image to produce a desired mosaic image 18 during the compositing phase. The exemplary methodology described herein may be structured to composite "on the fly" or to utilize previously generated positional representations for post-compositing.

The illustrated configuration of apparatus 10 includes a memory 30 and processing circuitry 32. Memory 30 is configured to receive and store image data 26 comprising the frame data 28. Processing circuitry 32 is arranged to process image data 26 to generate digital mosaic data which is utilized to form mosaic images 18 of respective sources 12.

Processing circuitry 32 is depicted in an exemplary notebook computer arrangement in the depicted arrangement. Other exemplary configurations of processing circuitry 32 include personal computers, workstations or other digital processing arrangements. Although memory 30 is depicted externally of the notebook computer for explanation purposes, in typical arrangements, memory 30 is embodied within the computer. Exemplary memory may be implemented as hard disk memory, random access memory, read only memory, flash memory or other memory arrangements for storing digital data.

Imaging apparatus 10 is arranged to implement formation of mosaic images 18 during operations in a plurality of operational modes. In one exemplary post-compositing operational mode, the appropriate image device 19, 20 generates image data 26 comprising frame data 28 which is stored in memory 30 as a plurality of rasters. At a later moment in time, processing circuitry 32 accesses the stored image data 28 and formulates the mosaic image 18. According to another possible operational mode described above, processing circuitry 32 operates to formulate mosaic images 18 during imaging operations of devices 19, 20 "on-the-fly" in real time. An intermediate mode is also exemplified by computing and storing frame displacement data in real time and using this data to post-composite stored image data into a mosaic at a later time. Images, including the mosaic images 18, may be depicted using display 33.

As described herein, imaging apparatus 10 includes data circuitry 34 configured to provide image data 26 for a plurality of the frames which is utilized to formulate mosaic images 18. During post-compositing operations wherein mosaic images 18 are generated at later moments in time, data circuitry 34 refers to memory 30 configured to provide the image data 26. During real-time imaging operations, data circuitry 34 refers to image devices 19, 20 even though frame data 28 generated thereby may be momentarily buffered within memory 30.

A plurality of exemplary methodologies performed at least partially by apparatus 10 are described. The depicted methodologies are exemplary to illustrate some aspects of the invention. Other methodologies may be utilized including more steps, less steps and\or alternative steps. In addition, the methodologies are described with reference to execution by processing circuitry in the exemplary computer-implemented embodiment. In this configuration, instructions of the depicted methodologies may be embedded in appropriate software, firmware and/or other instruction configuration, and are executed by a programmable processor available from Intel Corporation or Advanced Micro Device, Inc., for example. In alternative configurations, some or all of the depicted methodology steps may be implemented within hardware.

Figure 2:
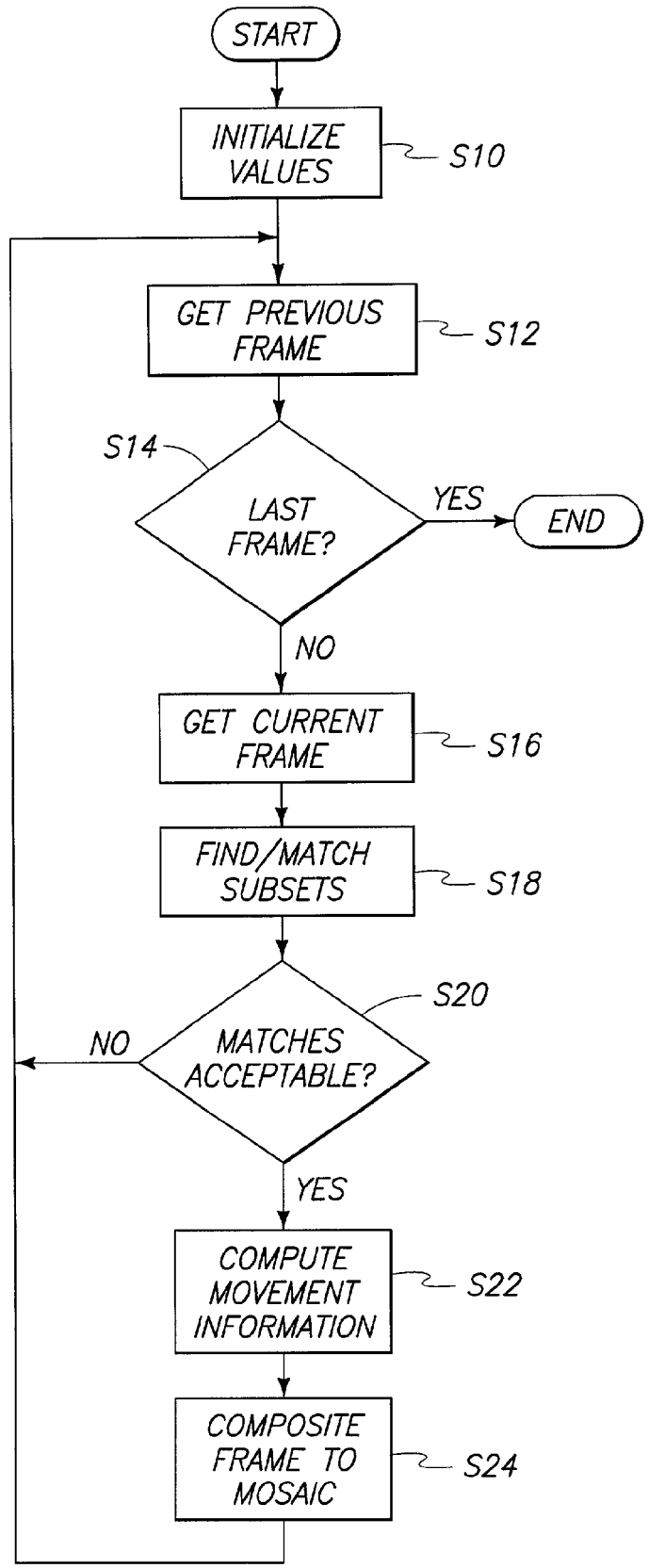
FIG. 2 depicts a flowchart of an exemplary methodology for generating a mosaic image from multi-frame sequences.

Referring to FIG. 2, operations performed by processing circuitry 32 are described according to an exemplary system "on-the-fly" compositing methodology for generating mosaic images 18 using apparatus 10.

Initially, at a step S10, the processing circuitry proceeds to initialize values which may be utilized during execution of the depicted exemplary methodology. For example, the processing circuitry may input approximated information regarding movement of image devices during provision of frame data for a plurality of frame images (i.e., during generation of a multi-frame sequence). An exemplary value may be velocity information of the respective image device.

At a step S12, the processing circuitry performs a get_frame operation to establish a previous frame. Exemplary get_frame operations of steps S12 and S16 are described in FIGS. 3 and 4. In general, the processing circuitry obtains frame data for a selected one of the frames during the get_frame operation.

At a step S14, the processing circuitry determines whether the frame data retrieved in step S12 is the last frame data of the sequence.

If the condition of step S14 is affirmative, the depicted methodology ends and the resultant mosaic image may be stored in memory, imaged using a display and/or utilized in another appropriate manner.

At a step S16, processing circuitry proceeds to obtain frame data for a successive frame. According to one possible implementation, the processing circuitry obtains frame data for the next frame in the sequence. An exemplary get_frame methodology is discussed with respect to FIGS. 3 and 4 and may again be utilized to implement step S16.

At a step S18, processing circuitry finds and matches one or more frame subset (e.g., four frame subsets) using the frame data for the current frame image retrieved in step S16 and the previous frame image from the last cycle (step S12). An exemplary methodology for performing find/match operations is described with respect to FIG. 5 below. The processing circuitry determines movement information between the generation of the frame image of step S12 and the frame image of step S16 using the found and matched frame subsets.

Frame subset may be utilized to refer to a portion of frame data of a respective frame image and may also be referred to as a glyph or feature. An exemplary size of a frame subset is 32×32 pixels, although other sizes are possible. The size of the frame subset may be chosen to correspond to an integer multiple of the wordsize of apparatus 10 to facilitate computational operations.

At a step S20, the processing circuitry determines whether the found and matched subsets are acceptable. An exemplary methodology performed by the processing circuitry is discussed below with respect to FIG. 7 for determining whether the matched subsets are acceptable.

If the condition of step S20 is negative, the processing circuitry returns to step S12 to repeat the above-described process.

If the condition of step S20 is affirmative, the processing circuitry proceeds to a step S22 to compute movement data corresponding to movement of frame subsets within respective frame data of a plurality of frame images. The movement data corresponds to movement of one or both of the source and image device during the creation of the frame images. In the described exemplary configuration, movement data may be represented by back-transforms which are generated using a plurality of deltas computed responsive to frame subset matching for a plurality of frame images 24. Exemplary calculation operations of the delta and back-transform are discussed below with respect to FIG. 5.

At a step S24, the processing circuitry operates to composite image data from the current frame data of step S16 into the mosaic image. Exemplary compositing operations are described below with respect to FIGS. 8 and 9.

Thereafter, the processing circuitry returns to step S12 to complete processing of the image data. For example, during a next, subsequent execution of the depicted methodology, the previous frame in step S12 corresponds to the current frame of step S16 of the previous execution of the methodology of FIG. 2 and the current frame of step S16 becomes a new, current frame.

Figure 3:
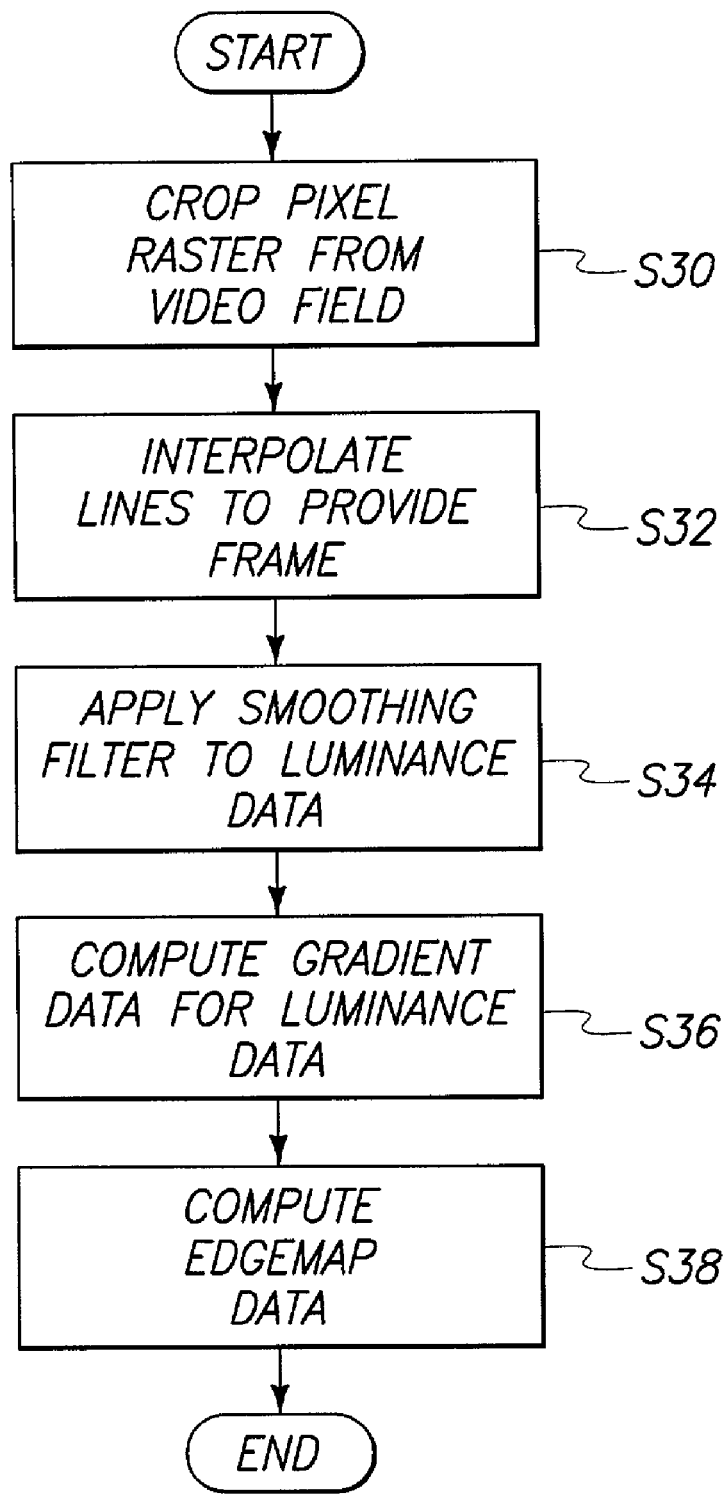
FIG. 3 depicts a flowchart of an exemplary methodology of operations performed upon individual frame images.

Referring to FIG. 3, an exemplary methodology for performing a get_frame operation of FIG. 2 is illustrated. Initially, at a step S30, the processing circuitry crops a pixel raster from received video fields. For example, data may be provided in a plurality of video fields including 720×243 YUV video fields as mentioned above. Processing circuitry may crop 640×240 pixel rasters from the respective video fields.

At a step S32, the processing circuitry interpolates lines to provide frame data for the respective frames. The resultant frame data corresponds to 640 by 480 (X size by Y size) frames. At this point in time, the processing circuitry may save chrominance UV information for later mosaicing. According to aspects of the present invention, processing of the frame data proceeds with respect to luminance information thereof and in accordance with exemplary operations, the chrominance information is stored for later usage in generating the resultant mosaic image. The described exemplary tracking phase is performed using the luminance data. Other tracking phase methodologies are possible.

At a step S34, the processing circuitry is arranged to apply a 3×3 smoothing filter to luminance data (intensity or Y data) of the frame data.

At a step S36, the processing circuitry computes gradient data using the luminance data providing vector information including gradient magnitude and direction information. In one exemplary configuration, the gradient magnitude and direction information may be computed using a Sobel Operator. Other possible operators or methods of calculating gradient data are possible.

At a step S38, the processing circuitry computes edgemap data from the gradient data calculated in step S36. Exemplary edgemap computations are described below with reference to FIG. 4. Using the depicted exemplary methodology of FIG. 3, the processing circuitry converts luminance data of the image data into edgepoints for individual frame data wherein frame data is initially filtered and gradient data is calculated using the frame data after the filtering. Subsequently, respective frame thresholds are identified using the gradient data as described further below.

Figure 4:
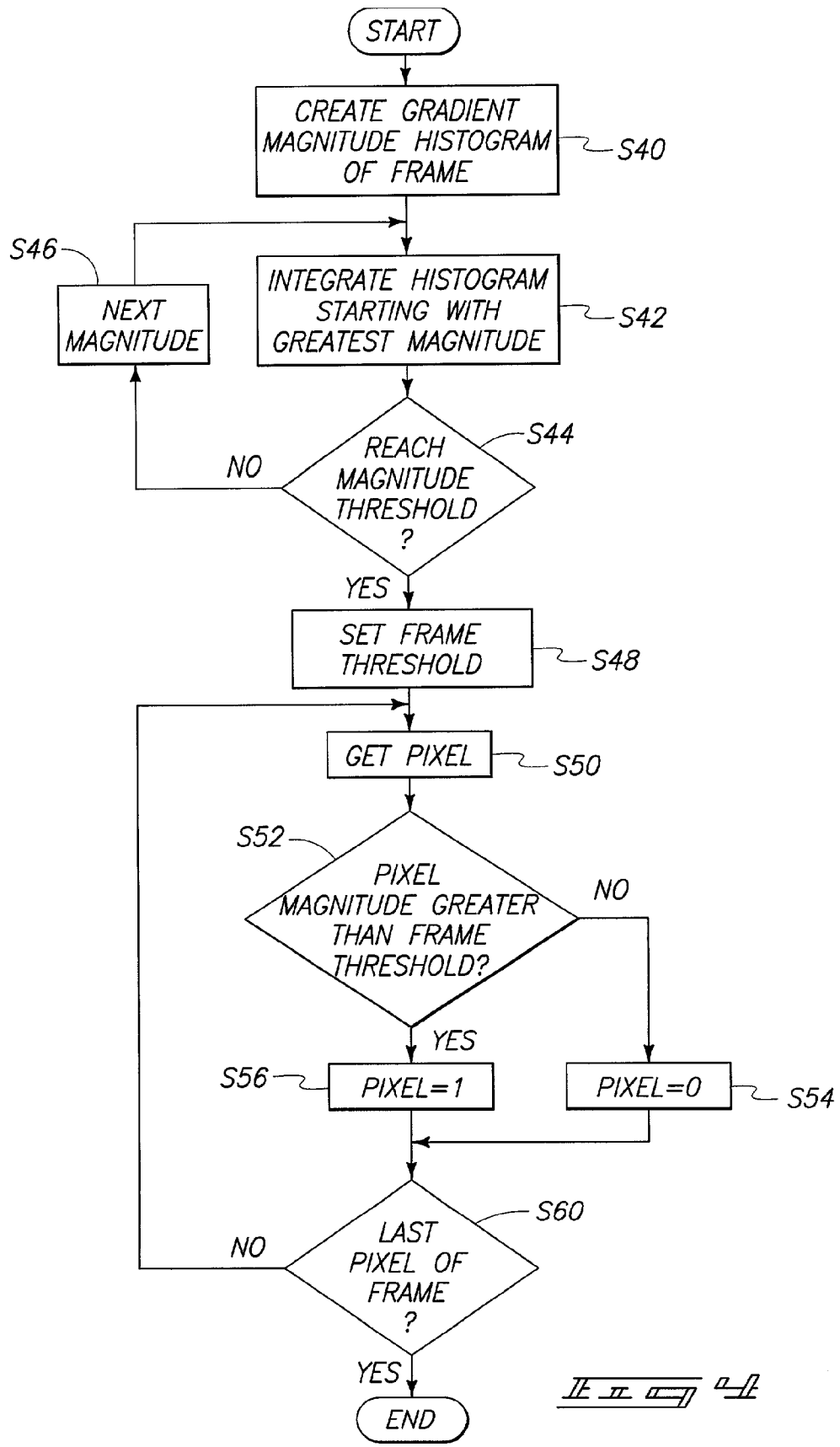
FIG. 4 depicts a flowchart of an exemplary methodology for computing edgemap data for individual frame images.

Referring to FIG. 4, an exemplary methodology for performing the compute edgemap data of step S38 of FIG. 3 is illustrated. In general, the processing circuitry is operable to convert digital image data into a plurality of edgemaps which comprise a plurality of edgepoints corresponding to appropriate pixels having sufficient luminance data determined from the frame data.

At a step S40, the processing circuitry creates a plurality of gradient magnitude histograms for respective frames. The processing circuitry uses gradient magnitude data derived from respective frame data of respective frame images to generate the respective histograms. Processing circuitry operates to provide the histograms including a plurality of groups corresponding to different gradient magnitude data. Using 1-byte data structures, 256 different groups (e.g., 0–255) may be conveniently utilized. Other numbers of groups are possible. Pixels are arranged into the groups corresponding to their respective gradient magnitude data (e.g., a pixel having a luminance gradient magnitude of 135 is placed in group 135).

At a step S42, the processing circuitry integrates the histogram starting with a greatest magnitude group of the histogram (e.g., 255) in the exemplary depicted embodiment.

At a step S44, the processing circuitry compares the integration (total number of pixels from the integrated groups) with a magnitude threshold, such as an integrated gradient magnitude threshold. The magnitude threshold may be selected from a plurality of possible values depending upon the type of source being panned, scanned or otherwise imaged. For example, the magnitude threshold may be set to equal 12% of the total number of pixels of the frame for scanning of panoramic images and 20% for scanning of documents. Other magnitude thresholds may be utilized.

As mentioned above, the processing circuitry starts by counting the number of pixels within group 255 at step S42. If the comparison of step S44 for the first group is negative, the processing circuitry proceeds to obtain pixel data from a next group of decreasing threshold (group having the next smaller magnitude, for example, group 254) at a step S46.

Returning to step S42, the total number of pixels of the integrated groups is determined and the number is compared with the threshold at step S44. Steps S42, S44 and S46 are repeated and pixel data from the groups of decreasing magnitude are integrated until the threshold is reached.

Once the total number of integrated pixels reaches the magnitude threshold as determined in step S44, the corresponding group magnitude value is utilized at step S48 to set a frame threshold, such as a frame gradient magnitude threshold. For example, the corresponding magnitude value (e.g., the value from 0–255) of the group which satisfies the condition of step S44 is utilized to set the frame threshold.

At a step S50, the processing circuitry proceeds to obtain individual gradient magnitude information for individual pixels of the frame data.

At a step S52, processing circuitry determines whether the gradient magnitude for a current pixel is greater than the frame threshold.

If the condition of step S52 is negative, the processing circuitry proceeds to set the edgemap data value for the respective pixel to 0 at a step S54.

If the condition of step S52 is affirmative, the processing circuitry proceeds to a step S56 to set the edgemap data value for the pixel to 1 and the pixel is indicated as an edgepoint indicating sufficient intensity information is present at the respective pixel in the described exemplary embodiment.

At a step S60, the processing circuitry determines whether the previously analyzed data is for the last pixel of the frame data being analyzed.

If the analysis of step S60 is affirmative, the edgemap analysis is complete and any edgepoints for the frame data are identified.

If the condition of step S60 is negative, the processing circuitry returns to step S50 to continue the pixel and edgepoint analysis of steps S52, S54, S56.

In the described exemplary methodology, the processing circuitry selects frame data and respective frame thresholds for the frames. The processing circuitry is configured to calculate a plurality of different frame thresholds for respective frames using image data of the respective frames and to compare frame data of plural frame images with the respective different frame thresholds to convert image data into edgepoints according to one aspect of the invention. Edgepoints are identified responsive to comparing operations for individual frames. In addition, analysis of gradient information of the luminance or intensity frame data for a plurality of pixels with respect to a plurality of thresholds is provided. Image data of respective frame images is compared with respective frame thresholds to identify interesting frame subsets as described further below.

Accordingly, in at least one aspect, the processing circuitry is configured to utilize gradient data to define edgepoints in frame data. Being able to vary frame thresholds (e.g., by choosing an appropriate one of a plurality of frame thresholds corresponding to respective frame data being analyzed) enables the processing circuitry to adaptively analyze the data using parameters derived from the data itself. This adaptive analysis provides methodologies including matching and stitching operations which are more robust (i.e., less sensitive to changes in lighting and other variations between frame data).

Figure 5:
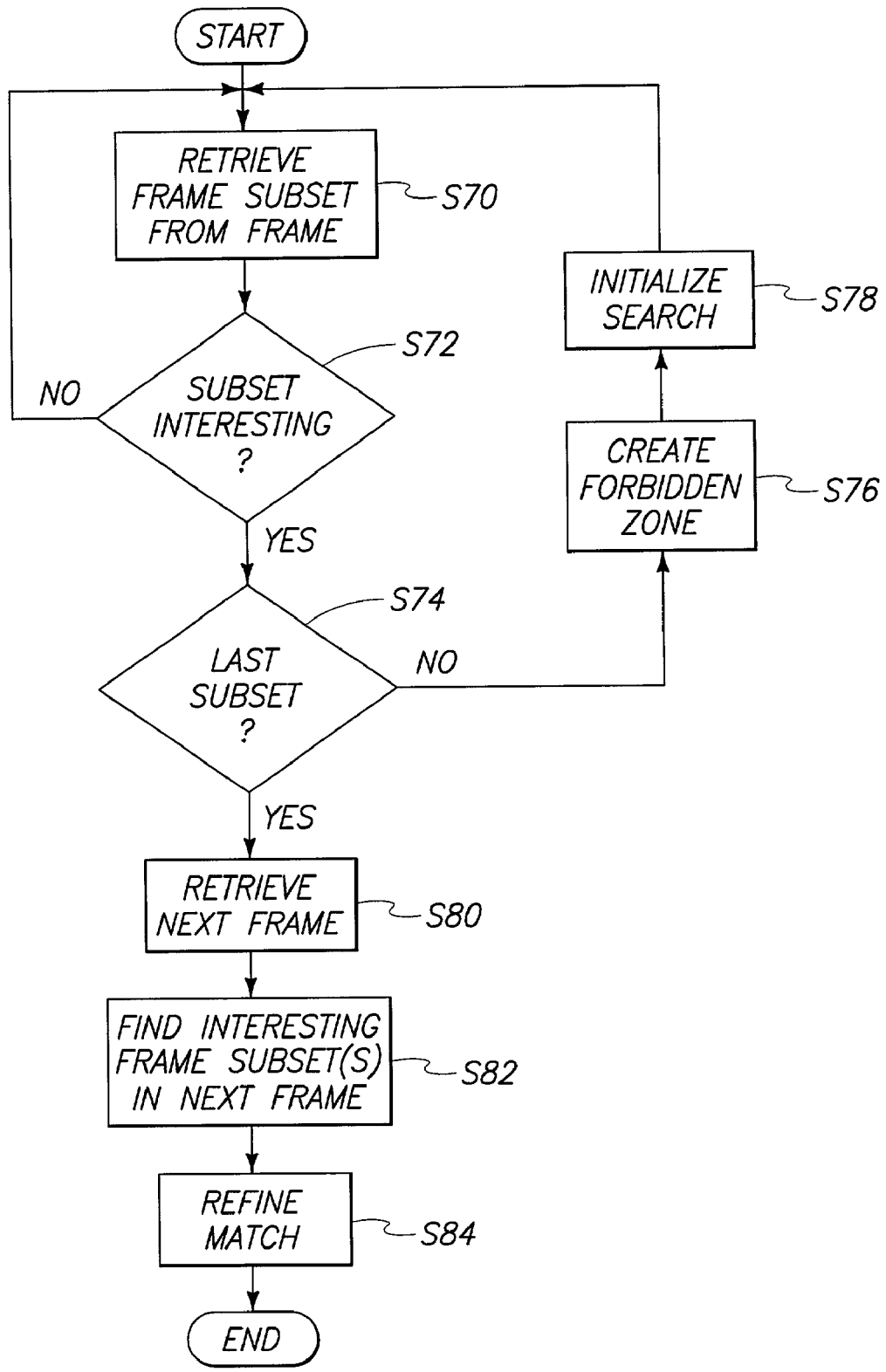
FIG. 5 depicts a flowchart of an exemplary methodology for matching frame subsets in a plurality of frame images.

Referring to FIG. 5, an exemplary methodology for finding and matching interesting frame subsets of frame data is described. The methodology is utilized to provide movement information for use in the tracking phase.

Initially, at a step S70, the processing circuitry retrieves a frame subset of data from the previous frame data being analyzed.

At a step S72, it is determined whether the frame subset meets interesting criteria. According to one exemplary embodiment, the frame subset is determined to be interesting if a plurality of exemplary conditions are met. Other conditions than those discussed herein are possible.

A first condition determines whether a threshold of the pixels of the frame subset comprise edgepoints indicating significant intensity variation information within the frame subset. In one possible embodiment, a first interesting threshold is set to 12% wherein if 12% of the pixels of the frame subset comprise edgepoints, the first condition is met. Otherwise, the frame subset is deemed not interesting and is not utilized for matching operations. Other threshold values may be utilized.

A second condition which may be utilized to determine if a frame subset is interesting analyzes directional information of the gradient data. In one possible directional analysis, the processing circuitry histograms directional gradient information of all pixels of the subset. Next, the processing circuitry forms a wedge of a predetermined size (e.g., 45°) and steps the wedge around a circle in 256 increments (e.g., as opposed to 360 degree increments to facilitate single byte analysis in accordance with one possible embodiment). During the directional analysis, 256 groups are identified and individually comprise a number of pixels which fall within the wedge for the group. It is then determined if the number of pixels within any group exceeds a second interesting threshold. In one possible embodiment, the second interesting threshold is 55% of the total number of pixels. If the number of pixels within any group does not exceed the second interesting threshold, the subset is determined to be interesting (if the appropriate number of pixels comprise edgepoints as determined above). If the number of pixels exceeds the second interesting threshold, then the frame subset is not determined to be interesting and other frame subsets are analyzed. The described exemplary directional analysis facilitates localization of the frame subset with respect to the frame data.

If the condition of step S72 is negative, the processing circuitry returns to step S70 to analyze another frame subset. The processing circuitry may implement a searching process to obtain interesting frame subsets. In accordance with one exemplary methodology, the processing circuitry starts at a corner of the frame data and proceeds in an X direction to analyze subsequent frame subsets along a first row and proceeds in the opposite X direction for a next row until an appropriate frame subset is determined to be interesting. Other searching methodologies may be implemented.

During the searching of frame subsets as described, and if the condition of step S72 is in the affirmative for a given frame subset, the processing circuitry proceeds to a step S74. At step S74, the processing circuitry determines whether more frame subsets from the frame data are to be found.

If the condition of step S74 is in the negative, the processing circuitry proceeds to a step S76 to create a forbidden zone. The forbidden zone creates an area around the frame subset identified in step S72. In one exemplary configuration, a forbidden zone of 64×64 pixels is defined about the identified frame subset found to be interesting in step S72.

At a step S78, the processing circuitry initializes a search starting point to find the subsequent or next interesting frame subset of the frame. In one exemplary embodiment, processing circuitry may provide the starting point at a corner opposite to the corner utilized to find the previous interesting frame subset. The processing circuitry may then proceed to analyze frame subsets in the X direction of a row, change to a different row and return in the opposite X direction until another interesting frame subset is identified. Searching for the subsequent frame subsets is permitted outside of the forbidden zones identified in step S76. Following the completion of step S78, the processing circuitry returns to step S70 to retrieve the appropriate frame subset to be analyzed.

According to the above described exemplary aspects, the processing circuitry may identify a plurality of frame subsets to calculate movement information of increased accuracy between a plurality of frame images. The depicted methodology of FIG. 5 accommodates an embodiment wherein a plurality of frame subsets are identified for individual frame images. More specifically, this methodology enables or provides a plurality of frame subsets determined to be interesting which are spaced a significant distance from one another to enable the calculation of more accurate movement information between adjacent frame images. Steps S74, S76 and S78 may be omitted in configurations wherein a single frame subset is identified within individual frames and utilized to provide movement information.

If the condition of step S74 is affirmative, the processing circuitry proceeds to a step S80 to retrieve frame data for a current frame image, such as the next successive frame image with respect to the previously analyzed image.

At a step S82, the processing circuitry uses the identified one or more frame subset to attempt to find the interesting frame subset(s) in the current frame data retrieved in step S80. According to one aspect, a starting location for searching for a frame subset in the second frame may be determined or identified using the respective frame subset of the first frame and previously determined movement information (e.g., dx, dy values) for a previously analyzed pair of frame images. The processing circuitry searches for a match of the frame subset from the starting location. For example, the processing circuitry may calculate xf−dx, yf−dy to start searching wherein xf, yf is an upper left corner coordinate of the frame subset in the first frame, and dx, dy is translation movement information calculated from a previously analyzed pair of frame images. From this location, the processing circuitry may be configured to spiral out in an exhaustive search over a fixed area selecting the location with a minimum difference. Other searching methods may be used.

Frame subset matches may be determined by subtracting analyzed frame subsets (i.e., frame subsets from the first and second frames) from one another and locating a minimum value. In the described exemplary embodiment, an XOR operation may be utilized to compare frame subsets and locate a minimum difference. If the size of rows of the frame subsets (e.g., 32 bits) is chosen to correspond to a wordsize of the computer or other apparatus comprising the processing circuitry, the minimum difference analysis may be conveniently performed in 32 XOR instructions.

Following location and matching of the interesting subsets in the next frame, the processing circuitry proceeds to refine the matching of the frame subsets in step S84. The refining may be referred to as fine tuning the location to sub-pixel accuracy of individual frame subsets in the current frame data retrieved in step S80. An exemplary refining methodology is described with reference to FIG. 6.

Referring again to step S22 of FIG. 2, the processing circuitry utilizes the matched frame subsets to determine movement information between the two frames being analyzed in the process of FIG. 5. The movement information may be utilized to create a positional representation comprising a delta and back-transform in one exemplary embodiment. The delta may be subsequently utilized to update the back-transform which is used to provide or map frame data of the second frame image retrieved in step S80 into the first frame image and the mosaic image.

If one frame subset is matched in both frame images, translation information (dx, dy) may be identified. If two frame subsets are matched in both frame images, translation information, rotation information (dtheta), and scale change information (ds) may be identified between the frames. If four frame subsets are identified and matched in both frames, tilt information may also be provided. Alternatively, the four features can be used to increase the reliability and accuracy of a two feature (dx, dy, dtheta, ds) delta by a process of least-mean-square error (LMSE) fitting; the solution for the exemplary described document scanning was further constrained by specifying s=0.

Accordingly, using the depicted exemplary method of FIGS. 2 and 5, a plurality of common edgepoints (corresponding to the frame subsets) in first frame data and second frame data are identified. The processing circuitry determines the movement data described above between the first frame and the second frame using the common edgepoints. This information generates a positional representation of movement in the form of respective deltas and respective back-transforms for pairs of first and second frames. As discussed in detail below, the processing circuitry maps image data from a second frame into the mosaic data using the movement data and positional representation to generate a mosaic image of the image using the mosaic data.

Referring to FIG. 6, exemplary refining operations are illustrated corresponding to step S84 of FIG. 5 for refining matched frame subsets of second frames.

Initially, at a step S90, the processing circuitry calculates grayscale difference data of the matched subsets at a plurality of different locations. For example, the second frame subset provides a first grayscale difference with respect to the first frame subset. The second frame subset is then moved an incremental distance from the matched location (e.g., one pixel in an X direction) and the grayscale difference is calculated again. Thereafter, the frame subset may be moved in the opposite X direction from the originally found position and the respective grayscale difference again calculated to provide three different values. The grayscale difference analysis may be also performed in the Y direction in additional or alternative arrangements.

At a step S92, it is determined whether the middle grayscale difference value corresponding to the originally matched position of the frame subset is a minimum.

If the condition of step S92 is negative, the processing circuitry proceeds to a step S94 to adjust the matched subset and recalculate values in step S90. In one possible analysis, the processing circuitry moves the frame subset starting point to the location which provided the minimum grayscale difference of the found values and the calculation of values of step S90 is repeated. The processing is repeated until the condition of step S92 is affirmative.

At a step S96, the processing circuitry fits a parabola to the different grayscale values.

At a step S98, the processing circuitry finds a minimum value on the parabola.

At a step S99, the processing circuitry adjusts the position of the matched frame subset of the second frame image to correspond to the minimum value of the parabola. Often, the adjustment of step S99, results in sub-pixel refining increments which may be used for the movement information calculations of increased matching.

Referring to FIG. 7, an exemplary methodology is described corresponding to step S20 of FIG. 2 to determine a quality of the matching of the frame subsets in the first and second frame images.

At a step S100, the processing circuitry calculates instantaneous acceleration between two frames being analyzed in FIG. 5. In one embodiment, a prediction method assumes constant velocity motion of the corresponding image device and uses a last frame-to-frame offset of a frame subset to predict the position of the frame subset in a subsequent next frame. Any deviation of a best match position from the predicted position can be taken as a measure of instantaneous camera acceleration.

The processing circuitry calculates a normalized edgepoint difference in step S102. A normalized edgepoint difference (nd) is defined as 0<=nd<=1. In searching for a best match, 32×32 pixels provides a maximum of 1024 edgepoints between a chosen frame subset for the first frame and a current match frame subset candidate in the second frame. The ratio of a minimum of the edgepoints is calculated to the mean wherein nd=min _diff/mean_diff where nd=0 is a perfect match and nd=1 is a flat image containing no information.

At a step S104, the processing circuitry calculates a minimum grayscale difference per pixel found during refinement described above with respect to step S84.

Forbidden regions may be defined for the steps S100, S102 and S104 and if a resultant match falls within any of forbidden regions, further analysis is performed. Accordingly, at a step S106, if the calculations are acceptable, the processing circuitry ends the depicted methodology.

Alternatively, the processing circuitry proceeds to a step S108 to perform an enhanced grayscale difference search using a grayscale difference calculation on larger 64×64 features corresponding to the matched frame subsets. The enhanced search of step S108 assists with obtaining more reliable low spatial frequency detail in low signal to noise ratio regions.

At a step S110, it is determined whether the enhanced calculation is acceptable. If the match quality falls within a forbidden region, the match may be rejected.

If the condition of step S110 is affirmative, the methodology of FIG. 7 ceases.

Alternatively, if the enhanced calculation is not acceptable as determined by step S110, the processing circuitry disregards the second frame at step S112 and proceeds to step S12 of FIG. 2 and attempts to match one or more frame subset using other frame data for another frame image. In an alternative arrangement, the processing circuitry may initiate a search in the second frame again to attempt to locate another match instead of skipping the entire frame data.

According to the exemplary method, the processing circuitry is configured to analyze a match quality of common edgepoints or frame subsets in the plurality of frames and comprising at least one of acceleration information between frame images, edgepoint difference information and grayscale difference information. If the analysis is unacceptable as determined in steps S106 and S110, the processing circuitry operates to disregard information from the second frame and to disregard the common edgepoints and frame subsets identified therein responsive to the match quality analysis.

Referring to FIGS. 8 and 9, exemplary compositing operations are described to incorporate new image data from frame images into the mosaic data. The operations may be accomplished "on the fly" or using post-compositing.

With reference to FIG. 8, a plurality of coordinate systems including a mosaic coordinate system 60 and a frame coordinate system 62 are shown. Mosaic coordinate system 60 is represented by values X,Y while frame coordinate system is represented by values x,y. The mosaic coordinate system may correspond to or utilize the coordinate system of frame data of any one of the frame images. In the present discussion, the first frame image coordinate system may be utilized for convenience.

The mosaic image 18 is illustrated as comprising a plurality of pixels 64 which comprise image data obtained from one or more of the frame data. For example, pixels 64 are represented by "c" and "n" in the illustrated configuration. The pixels "c" represent pixels in the mosaic image 18 which were previously composited and written into the mosaic from one or more previous frame data. For example, pixels "c" represented within mosaic image 18 may have been provided by a first frame image, identified as reference 70, to start formation of the mosaic image 18. Thereafter, image data from a plurality of successive frame images (e.g., second frame image, identified as reference 72) is added to the mosaic data to generate the mosaic image 18.

Now referring to FIGS. 8 and 9, further exemplary compositing operations are discussed.

As set forth in the exemplary methodology of FIG. 9, the positional representation delta resulting from execution of step S22 of FIG. 2 is retrieved in step S120.

The processing circuitry updates the back-transform positional representation using the delta in step S122 if not already provided.

At a step S124, a current frame boundary rectangle 73 corresponding to current frame 72 is placed upon the mosaic image 18. This is accomplished in one embodiment by transforming four corner points of a current frame 72 into the mosaic coordinate system. In general, it yields a rotated rectangle. Referring to FIG. 8, the positions of some pixels are misaligned in the illustrative representation. Typically, the pixel locations are aligned in a raster.

At a step S126, a bounding box 66 is defined within the mosaic image 18. In the illustrated embodiment, bounding box 66 comprises a rectangle having a plurality of sides which are parallel to the X, Y coordinates of the mosaic image 18. The sides of the bounding box 66 are defined by the extreme (max. and min.) X, Y locations of the current frame boundary rectangle 73 placed upon image 18 as shown in FIG. 8.

At a step S128, new pixels are identified using the current frame image 72 and the previous frame image 70. In the depicted exemplary configuration of FIG. 8, new pixels are represented by "n" which are present in the second frame image 72 but not present in the first frame image 70.

At a step S130, the calculated updated back-transform of step S122 is utilized to identify corresponding pixels in the second frame image 72 for each "n" pixel. In the illustrated embodiment, the new pixels from image 18 are back-projected into the second frame data of the second frame image 72. Image data including for example, YUV values, may be computed by bi-linear interpolation of four pixel values of the second frame image which bound the identified back-projected pixel coordinate in the X and Y directions.

At a step S132, the mosaic image 18 is updated with interpolated image data from the second frame image 72 at the respective "n" pixel location. For example, the interpolated frame data from the second frame is placed at the pixel location identified in the bounding box 66.

As described in the exemplary methodology, the processing circuitry is configured to exclude at least some of the image data from the second frame image 72 (pixels of the second frame image already within the mosaic image 18) to define new image data not within the mosaic data. The processing circuitry is arranged to map the new image data using positional representations obtained from movement information determined by the edgemap and edgepoint analysis of luminance data described above.

As illustrated in FIG. 8, the processing circuitry is configured to equate a mosaic coordinate system and a frame coordinate system to map new frame data into the mosaic data in one exemplary arrangement. Movement information and positional representations including updated back-transforms permit the processing circuitry to map new image data into the mosaic image and to account for movement between successive frame images. Aspects of the invention configure processing circuitry to update back-transforms using edgemap data which permits coordination of the placement of image data into the mosaic image.

As described with reference to FIG. 8 and FIG. 9, and following the equating of the mosaic coordinate system and the frame coordinate system, the processing circuitry identifies image data from the second frame which may be mapped into the mosaic data. More specifically, and according to one exemplary methodology, the processing circuitry uses the second frame to provide a bounding box in the mosaic image using the movement information and positional representations derived by the edgemap data. The processing circuitry identifies new pixels of image data using the bounding box and places image data from a second frame image corresponding to the new pixels into the mosaic data used to form the mosaic image. The processing circuitry combines image data from the second frame with the mosaic data using determined movement information and positional representations.

Aspects described above are explained with the assumption of static scenes. Accordingly, frame subset motion is attributed to motion of image device and/or static scenes moved relative to the image device. An external set of motion sensors on an image device will permit distinguishing in-scene motion from image device motion. Even if the sensors were not accurate at the pixel level, the sensors could be utilized to limit a search in the tracking phase.

Further, if frame-to-frame image device rotations are sufficiently small, a search for frame subsets during tracking phase operations may be accomplished using translation information. Frame subset rotations may be measured by searching for a plurality of features within individual frames and computing differential translation. Alternatively, or in addition to translation information, rotation and tilt information may also be used to composite new pixels from successor frames into a growing mosaic image of the source being panned or scanned as mentioned above and utilizing a plurality of pairs of matched frame subsets for a single pair of first and second frames.

The protection sought is not to be limited to the disclosed embodiments, which are given by way of example only, but instead is to be limited only by the scope of the appended claims.

What is claimed is:

1. An imaging apparatus comprising:
   data circuitry configured to provide image data for a plurality of frames of a source; and
   processing circuitry configured to generate mosaic data for the source using the image data, wherein the processing circuitry is configured to convert the image data into a plurality of edgepoints for individual ones of the frames, to identify a plurality of common edgepoints in a first frame and a second frame, to determine a positional representation with respect to the first frame and the second frame using the common edgepoints, and to map image data from one of the first frame and the second frame into the mosaic data using the positional representation to generate a mosaic image of the source using the mosaic data.

2. The apparatus of claim 1 wherein the processing circuitry is configured to exclude at least some of the image data from the one of the first frame and the second frame to define new image data not within the mosaic data, and to map the new image data using the positional representation.

3. The apparatus of claim 1 wherein the processing circuitry is configured to determine the positional representation indicative of movement information of an image device between the first frame and the second frame.

4. The apparatus of claim 1 wherein the processing circuitry is configured to equate a mosaic coordinate system and a frame coordinate system to map the image data.

5. The apparatus of claim 1 wherein the processing circuitry is configured to determine a delta of the positional representation responsive to identifying the common edgepoints, to update a back-transform of the positional representation using the delta, and to map the image data using the back-transform after the updating.

6. The apparatus of claim 1 wherein the data circuitry comprises memory.

7. The apparatus of claim 1 wherein the data circuitry comprises an image device.

8. The apparatus of claim 1 wherein the processing circuitry is configured to convert luminance data of the image data into the edgepoints for the individual ones of the frames.

9. The apparatus of claim 1 wherein the processing circuitry is configured to analyze a match quality of the common edgepoints in the first frame and the second frame comprising at least one acceleration information between the frames, edgepoint difference information, and grayscale difference information, and to disregard the common edgepoints responsive to the match quality.

10. The apparatus of claim 1 wherein the processing is configured to refine relative motion of the common edgepoints after the identification of the edgepoints.

11. The apparatus of claim 1 wherein the processing circuitry is configured to identify the common edgepoints comprising locating interesting edgepoints in the first frame, and searching the second frame to locate the interesting edgepoints in the second frame.

12. The apparatus of claim 11 wherein the processing circuitry is configured to determine gradient data of the image data including gradient magnitude data and gradient directional data, and to utilize the gradient magnitude data and the gradient directional data to define the interesting edgepoints in the first frame.

13. The apparatus of claim 1 wherein the processing circuitry is configured to adaptively provide a plurality of frame thresholds corresponding to respective ones of the frames, and the processing circuitry is configured to compare image data of the frames with respective ones of the frame thresholds to convert the image data into the edgepoints.

14. A mosaic image compositing method comprising:
providing image data of a plurality of frames of an image;
converting the image data to edgemap data;
creating a mosaic image using image data from a plurality of the frames; and
coordinating placement of the image data into the mosaic image using the edgemap data.

15. The method of claim 14 wherein the coordinating comprises determining a positional representation using the edgemap data and corresponding to movement of an image device between frames of the image, and placing the image data from a selected one of the frames into the mosaic image using the positional representation.

16. The method of claim 15 wherein the determining the positional representation comprises identifying a plurality of common edgepoints of the edgemap data for the frames.

17. The method of claim 15 wherein the determining the positional representation comprises calculating a delta using luminance data of the image data, and updating a back-transform using the delta.

18. The method of claim 14 wherein the coordinating comprises equating a mosaic coordinate system and a frame coordinate system, and identifying the image data from the selected one of the frames responsive to the equating.

19. The method of claim 14 wherein the converting comprises converting luminance data of the image data.

20. The method of claim 14 wherein the coordinating comprises identifying a bounding box in the mosaic image using the edgemap data, identifying new pixels of the image data using the bounding box, and placing image data corresponding to the new pixels into the mosaic image.

21. A video stitching method comprising:
providing image data for a plurality of frames;
converting the image data into edgemap data;
first identifying a frame subset in a first frame using respective edgemap data of the first frame;
second identifying the frame subset in a second frame using respective edgemap data of the second frame;
providing movement information indicating movement between the first frame and the second frame responsive to the first identifying and the second identifying; and
combining at least some of the image data of the second frame with mosaic data using the movement information.

22. The method of claim 21 further comprising equating a mosaic coordinate system and a frame coordinate system, and wherein the combining occurs after the equating.

23. The method of claim 21 wherein the converting comprises converting luminance data of the image data.

24. The method of claim 23 wherein the converting comprises:
converting the luminance data into gradient data for the respective frames; and
converting the gradient data into the edgemap data comprising a plurality of edgepoints.

25. The method of claim 21 further comprising:
analyzing the frame subset of the first frame and the frame subset of the second frame;
disregarding the second frame responsive to the analyzing; and
third identifying the frame subset in a third frame responsive to the disregarding.

26. The method of claim 25 wherein the analyzing comprises analyzing acceleration information, edgepoint difference information, and grayscale difference information between the first frame and the second frame.

27. The method of claim 21 further comprising refining the second frame subset after the second identifying and before the providing the movement information.

28. The method of claim 21 wherein the second identifying comprises:
   identifying a starting location in the second frame using the frame subset of the first frame; and
   searching from the starting location.

29. The method of claim 21 wherein the first identifying comprises identifying a plurality of frame subsets in the first frame, and the second identifying comprises identifying the plurality of frame subsets in the second frame.

30. The method of claim 29 further comprising creating a forbidden zone in the first frame using an identified one of frame subsets of the first frame, and wherein the first identifying further comprises searching for another one of the frame subsets in the first frame, and excluding the forbidden search zone during the searching.

31. The method of claim 21 wherein the first identifying comprises identifying an interesting frame subset comprising calculating luminance gradient data, and analyzing directional data of the luminance gradient data to filter at least one other frame subset having insufficient different directional data.

32. The method of claim 21 wherein the first identifying comprises identifying an interesting frame subset comprising calculating luminance gradient data and analyzing a magnitude of the luminance gradient data of a plurality of pixels of the frame subset with the respect to a threshold.

33. The method of claim 21 wherein the first identifying comprises calculating a plurality of different thresholds for respective frames using image data of the respective frames, and comparing image data of the respective frames with respective ones of the thresholds.

34. The method of claim 21 wherein the combining comprises:
   generating a delta using the movement information;
   updating a back-transform using the delta;
   identifying new image data in the second frame not within the first frame; and
   positioning the new image data with the mosaic data using the back-transform after the updating.

* * * * *